(12) United States Patent
Hesmer

(10) Patent No.: US 7,487,895 B2
(45) Date of Patent: Feb. 10, 2009

(54) WHEELED CARRIER FOR A GOLF CLUB BAG AND A SET OF GOLF CLUBS WHICH CAN BE REMOVABLY SECURED TO A VEHICLE

(75) Inventor: Ronald G. Hesmer, Wilmington, NC (US)

(73) Assignee: Feat First Incorporated, Wilmington, NC (US)

( * ) Notice: Subject to any disclaimer, the term of this patent is extended or adjusted under 35 U.S.C. 154(b) by 889 days.

(21) Appl. No.: 10/852,219

(22) Filed: May 25, 2004

(65) Prior Publication Data

US 2005/0274761 A1    Dec. 15, 2005

(51) Int. Cl.
*B60R 9/00* (2006.01)
*B60R 11/00* (2006.01)

(52) U.S. Cl. .................. 224/519; 224/525; 224/527

(58) Field of Classification Search ................ 224/519, 224/527, 525
See application file for complete search history.

(56) References Cited

U.S. PATENT DOCUMENTS

| | | | |
|---|---|---|---|
| 4,907,728 A * | 3/1990 | Giblet | 224/585 |
| 5,038,983 A | 8/1991 | Tomososki | |
| 5,310,100 A | 5/1994 | Liscinsky | |
| 5,439,151 A | 8/1995 | Clayton | |
| 5,547,116 A | 8/1996 | Eckhart | |
| 5,586,702 A | 12/1996 | Sadler | |
| 5,862,966 A | 1/1999 | Mehis | |
| 6,036,070 A * | 3/2000 | Gauthier et al. | 224/527 |
| 6,039,227 A | 3/2000 | Stark | |
| 6,105,843 A | 8/2000 | Dollesin | |
| 6,398,290 B1 | 6/2002 | Williams et al. | |
| 6,471,104 B1 | 10/2002 | Janek | |
| 6,478,203 B2 * | 11/2002 | Burns | 224/510 |
| 6,494,352 B1 * | 12/2002 | Mullen | 224/524 |
| 6,761,368 B2 * | 7/2004 | Carter | 280/47.26 |
| 7,073,857 B1 * | 7/2006 | Bailey | 297/217.7 |
| 2003/0015562 A1 | 1/2003 | Jones et al. | |

* cited by examiner

*Primary Examiner*—Nathan J Newhouse
*Assistant Examiner*—Lester L Vanterpool
(74) *Attorney, Agent, or Firm*—Diller, Ramik & Wight (57) ABSTRACT

A wheeled carrier for a golf club bag and a set of golf clubs which can be removably secured to a vehicle include a one-piece in situ molded cover and wheeled carrier body pivotly secured to each other. The carrier body includes a rib slidably received in a channel of a vehicle hitch bracket. The handle, slidably connectors and pivot means are located to one side of a vertical plane opposite two wheels of the carrier body, a hand grip portion of the cover and a latch for securing the cover to the carrier body in the closed position thereof.

38 Claims, 6 Drawing Sheets

WHEELED CARRIER FOR A GOLF CLUB BAG AND A SET OF GOLF CLUBS WHICH CAN BE REMOVABLY SECURED TO A VEHICLE

BACKGROUND OF THE INVENTION

The invention is directed to a carrier particularly adapted to be transported by a motor vehicle, such as an automobile, a truck, or the like, which houses a golf club bag and a set of golf clubs.

Typical of carriers of the type to which the present invention is directed are disclosed in U.S. Pat. No. 6,494,352 to Rick L. Mullen entitled Multi-Mode Golf Bag Travel System and U.S. Pat. No. 6,478,203 issued to Jane Burns and entitled Golf Bag and Cart Carrier. Each of the latter patents, but particularly the patent to Mullen, discloses a system designed to carry a golf bag and set of golf clubs with each system utilizing a relatively rigid carrier and hitch assembly for connection to a vehicle hitch. Though the Mullen disclosure is perhaps the most pertinent to the invention disclosed and claimed herein, it is exceedingly complicated, costly to produce, and is of questionable marketability. The one-piece carrier of Burns is constructed from a shell of relatively hard rugged plastic material and includes a tubular member having a lower end which can be connected to tubular stubs of the vehicle hitch assembly. Other costly and complicated travel cases or carriers which were found during a prior art search of the present invention and are listed hereinafter as follows:

| | |
|---|---|
| 5,038,983 | Tomososki |
| 5,310,100 | Liscinsky |
| 5,439,151 | Clayton |
| 5,547,116 | Eckhart |
| 5,586,702 | Sadler |
| 5,862,966 | Mehis |
| 6,036,070 | Gauthier et al. |
| 6,039,227 | Stark |
| 6,105,843 | Dollesin |
| 6,398,290 B1 | Williams et al. |
| 6,471,104 B1 | Janek |
| 2003/0015562 A1 | Jones |

Though there is clearly a great demand for a carrier which can house a golf club bag and a set of golf clubs which can be readily and easily connected to a motor vehicle, the marketplace presently fails to supply the demand primarily because of the deficiencies noted and apparent in the carriers of the latter-identified patents.

SUMMARY OF THE INVENTION

The carrier of the present invention includes a tubular body and a cover each constructed from synthetic polymeric/copolymeric plastic material. The cover is hinged to the tubular body and normally closes an opening of the tubular body which is angled obliquely to a vertical axis of the tubular body. The latter effects the ready introduction of a set of golf clubs and an associated golf club bag into and the removal thereof from the tubular body.

The tubular body also includes a connecting portion beneath the cover pivot means for slidably connecting the carrier to a bracket which is in turn connected to a conventional vehicle hitch. The connecting portion of the tubular body, the pivot means of the cover and a carrying handle are all located substantially at the same side of the carrier and opposite to a handgrip portion of the cover and wheels at the bottom of the tubular body. The latter arrangement of structural components facilitates the gripping, carrying, loading, unloading and wheeling of the carrier, as well as the loading and unloading of a golf club bag and golf clubs relative to the tubular body.

The tubular body is preferably provided with an integral connecting portion of a generally T-shaped configuration which can be vertically connected to and disconnected from a generally C-shaped channel of a bracket assembly having a leg connected to a vehicle hitch. Due to the integral molding of the T-shaped connecting portion of the tubular body, a relatively economic connecting arrangement is provided, as compared to cumbersome and costly connectors found in prior art carriers.

In further accordance with the present invention, the T-shaped connecting portion of the tubular body and the C-shaped channel of the bracket assembly include portions having apertures which align with each other when the T-shaped connecting portion of the tubular body of the carrier is fully connected to the C-shaped channel of the bracket assembly. The apertures receive a hasp of a lock which greatly reduces theft, particularly when the carrier and an associated vehicle are left unattended.

The carrier also includes as the pivot means between the cover and the tubular body a pair of relatively flat pivot plates which carry at least one pivot pin and one tubular bearing in which the pivot pin can be slid in a direction normal to the longitudinal axis of the tubular body. This allows the cover to be entirely removed from the tubular body of the carrier which is advantageous when the carrier is attached to an automobile, a van or a SUV having an upright or squared-off rear area which might preclude the cover from pivoting open fully due to the impingement of the cover against the rear of the vehicle to which the carrier is attached. Allowing the cover to be removed from the tubular body permits golf course residents to attach the carrier "topless" (without the cover) to their personal golf carts when on short trips, be they golfing trips or shopping trips when the tubular body can be used as a "container" for groceries or the like absent the use of the cover.

With the above and other objects in view that will hereinafter appear, the nature of the invention will be more clearly understood by reference to the following detailed description, the appended claims and the several views illustrated in the accompanying drawings.

DETAILED DESCRIPTION OF THE INVENTION

Figure 1:
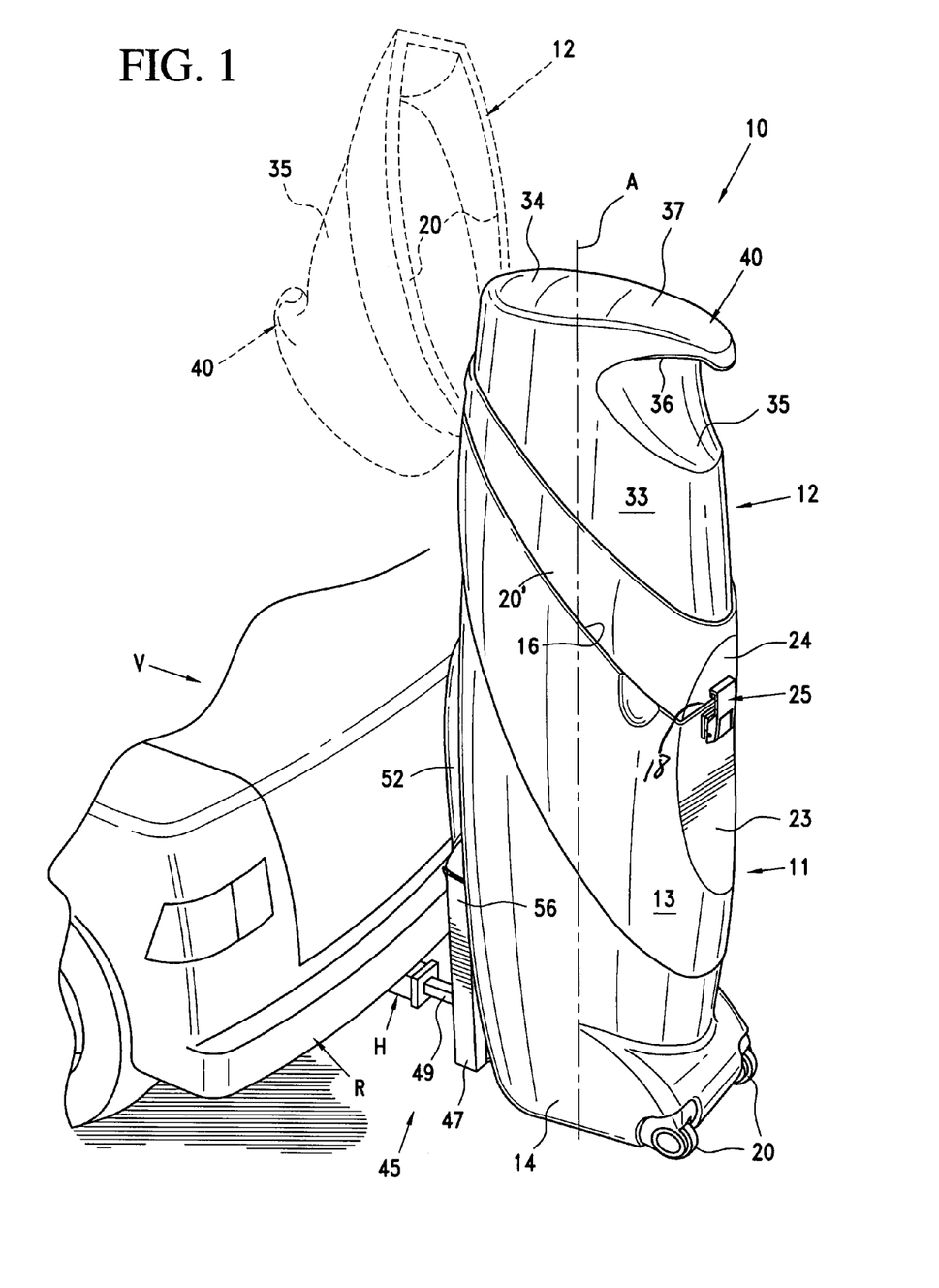
FIG. 1 is a fragmentary perspective view, and illustrates a carrier for housing a golf club bag and a set of golf clubs connected to a rear end of a motor vehicle, and in phantom outline illustrates a cover in its open position relative to a tubular body of the carrier.

A novel carrier constructed in accordance with this invention is fully illustrated in FIG. 1 of the drawings and is generally designated by the reference numeral 10.

The carrier 10 in FIG. 1 is shown assembled to a rear end R of motor vehicle V, such as an automobile, a truck, a golf cart or the like through a conventional tubular hitch H welded or otherwise secured to the undercarriage (unnumbered) of the vehicle V.

The carrier 10 is particularly adapted to house a golf club bag (not shown) in which is conventionally carried a set of golf clubs (also not shown). The carrier 10 includes a substantially tubular body 11 and a cover 12 each made of substantially strong, durable, synthetic polymeric/copolymeric plastic material each in situ molded of a one-piece construction.

Figure 2:
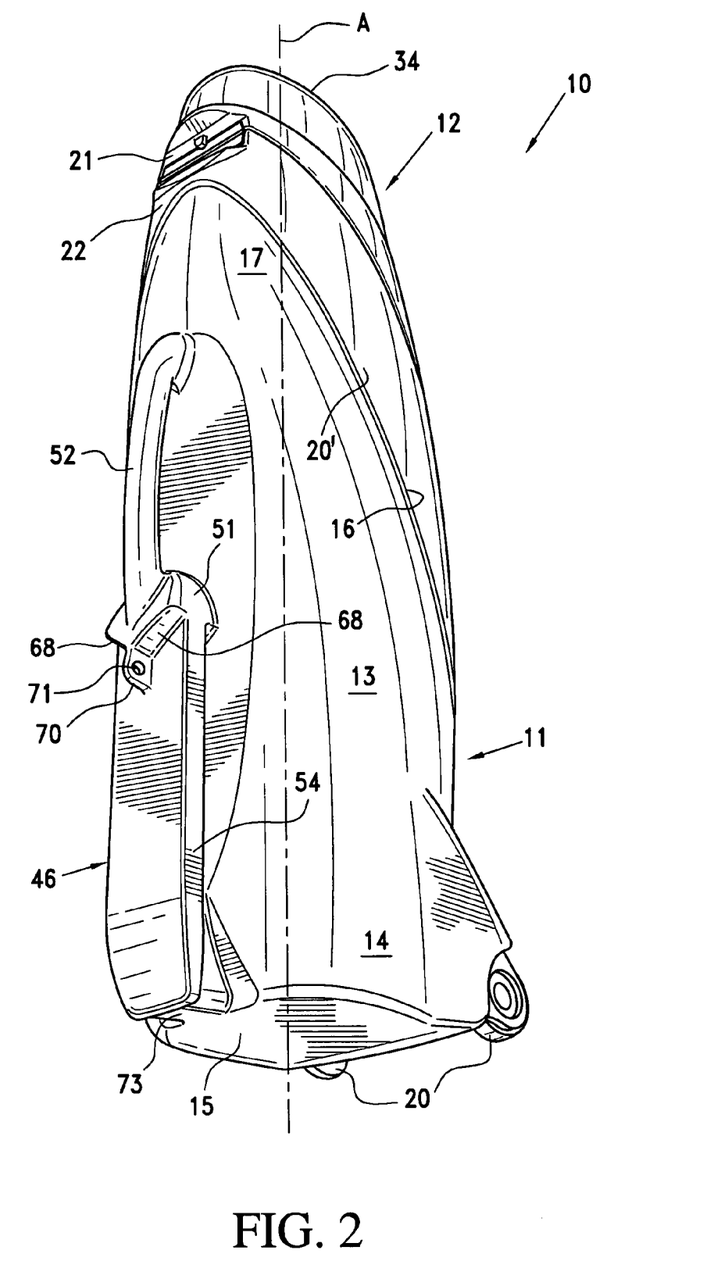
FIG. 2 is a bottom perspective view of the carrier of FIG. 1, and illustrates along one vertical side a pivot for connecting the cover to the tubular body, a handle therebeneath, and one of a two-part connecting means in the form of a vertically extending rib along the tubular body.

The tubular body 11 is defined by a peripheral wall 13 closed at a first end or a first end portion 14 by a bottom wall 15 (FIG. 2) and having an opening (not shown) defined by an upper peripheral edge 16 at a second end portion 17 of the tubular body 11 opposite the first end portion 14. The peripheral edge 16 is generally of an oval-shape configuration, as viewed from above, and is disposed obliquely or angulated with respect to a vertical axis A of the tubular body 11 which also corresponds to the vertical axis of the cover 12 in its closed condition/position (FIGS. 1 and 2). The angle defined by the upper peripheral edge 16 of the tubular body 11 with respect to the vertical axis A is approximately 45 degrees which facilitates the introduction of a golf club bag and an associated set of golf clubs into and the removal thereof from the interior of the tubular body 11, as can be readily visualized from FIG. 1. Additionally, a lowermost edge portion 18 (FIG. 1) of the peripheral edge 16 is rearward of the vehicle V which further facilitates the introduction and removal of a golf club bag/set of golf clubs relative to the tubular body 11.

The first end portion 14 of the tubular body 11 also carries a conventional pair of wheels 20 to facilitate the transport (pushing or pulling) of the carrier 10 when removed from the vehicle V. The cover 12 includes a lower peripheral edge portion 20 contoured to mate with and close the opening (not shown) defined by the upper peripheral edge 16 of the tubular body 11. Conventional hinge means or pivot means 21 (FIG. 2) pivotally connect the cover 12 to an uppermost rear portion 22 of the tubular body peripheral edge 17 which is substantially above and diametrically opposite to the lowermost edge portion 18. Diametrically opposite and below the pivot means 21 of the tubular body 11 and the cover 12 are respective flattened wall portions 23, 24 which carry a conventional "combination" latch/lock mechanism 25 which locks the cover 12 to the tubular body 11 in the closed position thereof shown in solid lines in FIG. 1. However, once the combination latch/lock mechanism 25 is opened, the cover 12 can be pivoted from its closed solid line position to its fully opened phantom outline position (FIG. 1) through pivoting about a pivot axis (unnumbered) defined by the conventional pivot means 21 (FIG. 2).

The cover 12 includes a peripheral wall 33 converging upwardly from its lowermost peripheral edge portion 20' toward a top wall 34. A forward or front wall portion 35 of the peripheral wall 33 of the cover 12 opens concavely forwardly and is in part defined by a lower facing concave wall portion 36 and an upper opposite convex wall portion 37 which jointly merge or taper toward each other to define a converging terminal apex wall portion, handle portion or handgrip portion 40 terminating at a handle end 41. The handgrip portion 40 lies in a vertical plane (not shown) which passes substantially midway between the wheels 20, 20 and normal to the rotation axis (not shown) thereof. Thus, the handgrip portion 40 is located substantially perfectly ergonomically with respect to the wheels 20, 20 to provide effortless pushing or pulling of the carrier 10 as the wheels 20, 20 roll upon an associated surface.

Figure 3:
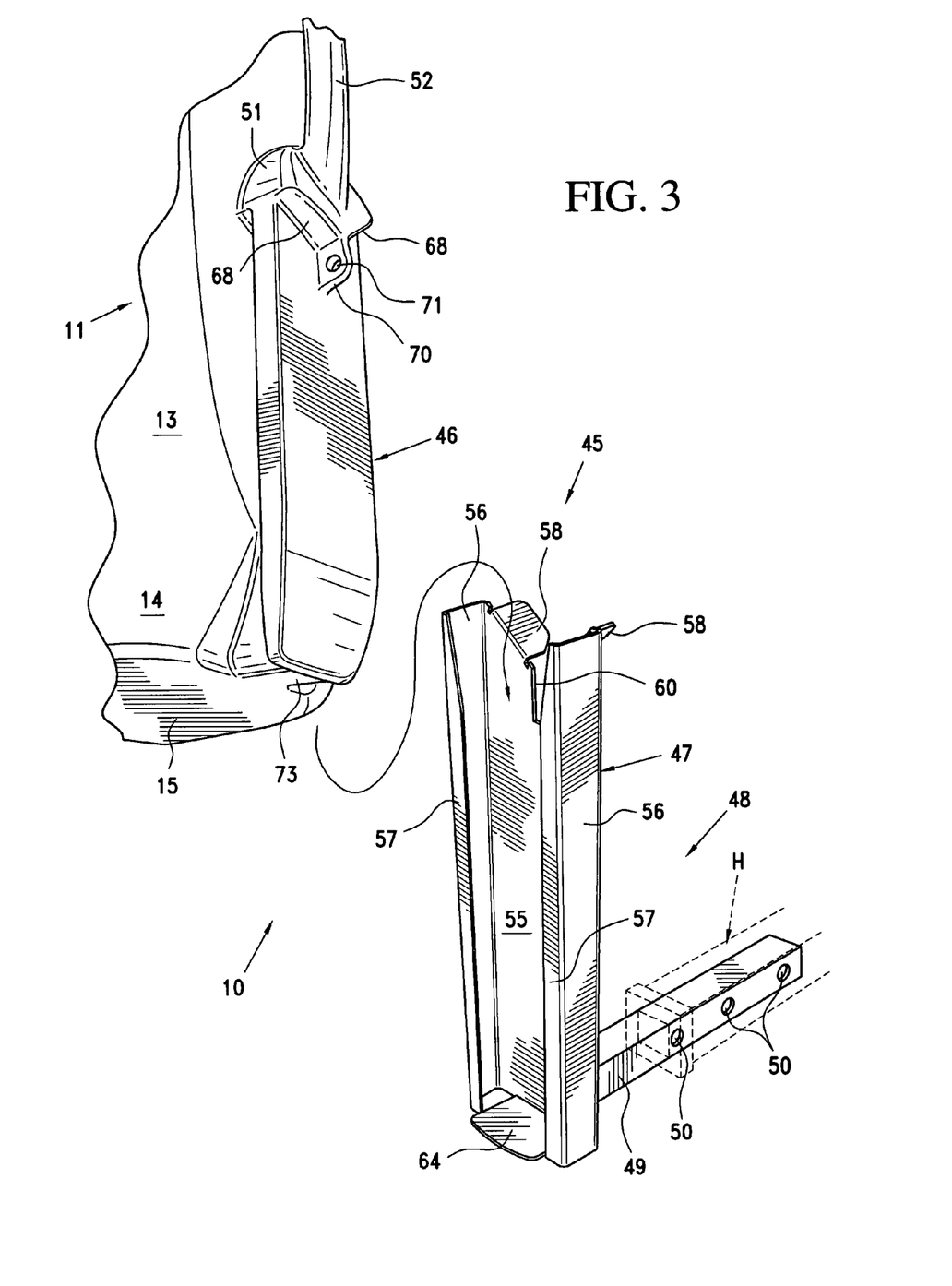
FIG. 3 is a fragmentary perspective view of a lower end portion of the carrier, and illustrates the rib thereof prior to being inserted into a vertical channel of a connecting bracket assembly having a lower leg adapted for receipt in a tubular hitch of a motor vehicle.
Figures 4, 5:
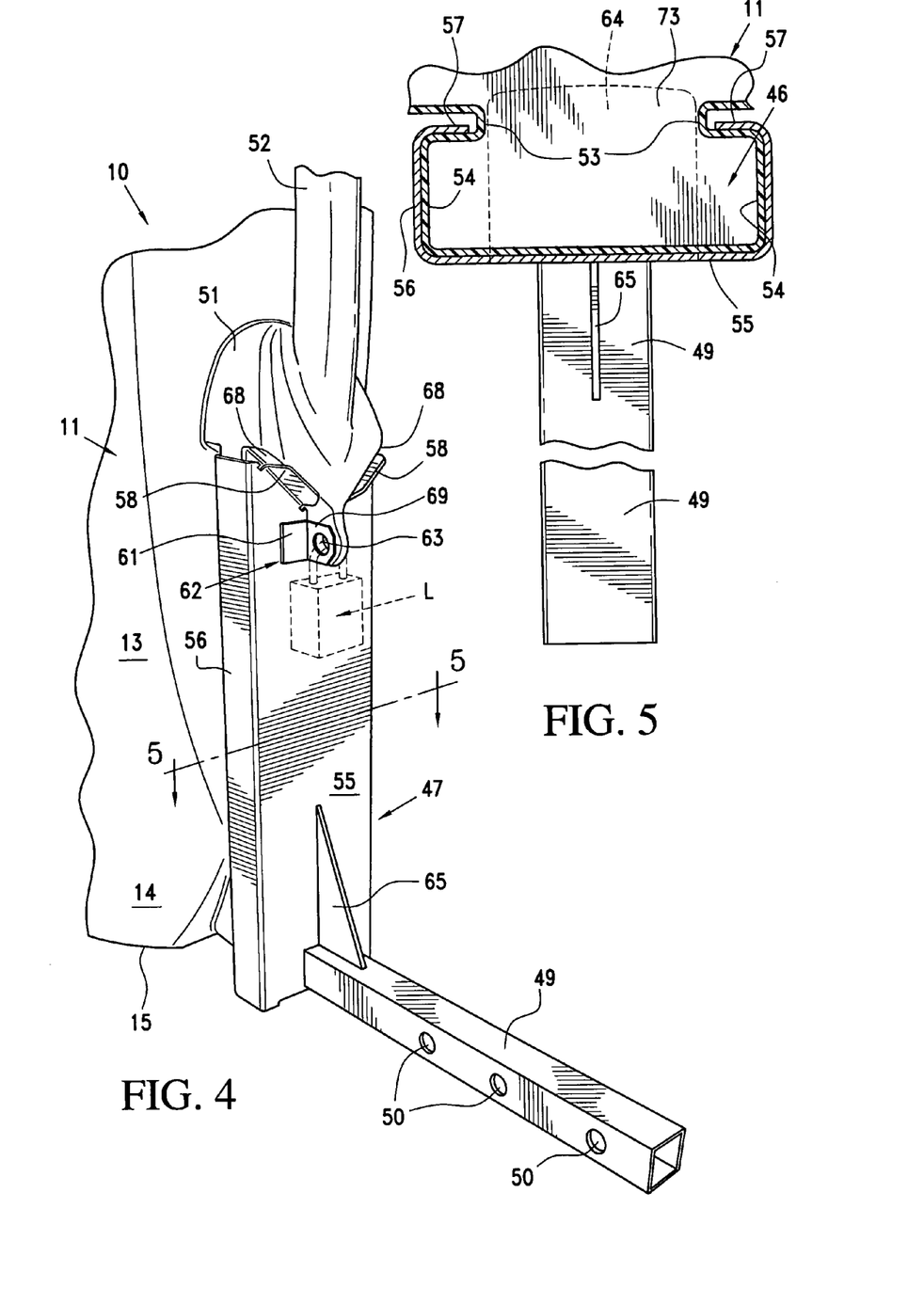
FIG. 4 is a fragmentary perspective view similar to FIG. 3, and illustrates the carrier slidably united through its rib with the channel of the bracket assembly and aligned apertures of the latter through which a hasp of a lock is adapted to be received.
FIG. 5 is a fragmentary enlarged cross-sectional view taken generally along line 5-5 of FIG. 4, and illustrates details of the C-shaped channel of the hitch bracket assembly and the T-shaped rib of the carrier tubular body.

A mechanism or means for removably connecting the tubular body 11 of the carrier 10 to the vehicle V is best illustrated in FIGS. 3 and 4 of the drawings and is generally designated by the reference numeral 45. The connecting means 45 include a substantially vertically disposed rib 46 of the tubular body 11 of the carrier 10 and a substantially vertically disposed channel 47 of a metal bracket assembly 48 which includes a substantially tubular rectangular leg 49 having a plurality of spaced openings or apertures 50 therein (FIG. 3). The leg 49 is inserted into the vehicle hitch H (FIGS. 1 and 2) and a locking pin or lock (not shown) is conventionally utilized to lock the leg 49 relative to the hitch H.

The rib 46 is an integral in situ molded portion of the tubular body 11 and extends upwardly from the bottom wall or base 15 (FIGS. 2 and 3) to a lower flared end 51 of a carrying handle 52 serving as a handgrip for manipulating the carrier 10. The rib 46 is of a hollow T-shaped cross-sectional configuration (FIG. 5) and is defined by a relatively short narrow hollow leg or neck 53 and a hollow crossbar 54 collectively defining the hollow T-shaped configuration thereof.

The channel 47 is of a generally U-shaped or C-shaped transverse cross-sectional configuration (FIGS. 3 and 5) defined by a bight wall 55, opposite parallel side walls 56, 56 and opposing flanges 57, 57. An upper edge of the bight wall 55 is blanked to form a pair of flanges or seats 58, 58 (FIG. 3) normal to the bight wall 55 between which is an upwardly opening slot 60. To one side of the slot 60 is welded a leg 61 (FIG. 4) of a metal L-shaped bracket 62 having an aperture or opening 63 in a leg 69 of the bracket 62. The bight wall 55 is also flanged at its lower end to form a supporting base wall 64 (FIGS. 3 and 5) of the channel 47. The channel 47 is appropriately conventionally welded to the leg 49 and is reinforced by an angle bracket 65 (FIG. 4) spanning and welded to the bight wall 55 of the channel 47 and the leg 49.

As is best illustrated in FIG. 3, the flared portion 51 below a lower end (unnumbered) of the handle 52 is provided during the molding of the tubular body 11 with angled seats 68, 68 and medially thereof a wall 70 having an aperture or opening 71 formed therein. The angle defined by the seats 68, 68 corresponds to the angle of the flanges 58, 58 of the channel 47. Thus, during assembly of the carrier 10 to the bracket assembly 48, the rib 46 is inserted downwardly into the channel 47 in the manner readily apparent from FIG. 3 until a bottom 73 of the rib 46 seats upon the base wall 64 of the channel 47, while at the same time the angled seats 68, 68 bottom and rest upon the flanges 58, 58 which automatically aligns the apertures or openings 71, 63 (FIG. 4). A hasp (unnumbered) of a lock L can be passed through the apertures 63, 71 after which the lock L can be locked to prevent the carrier 10 from being removed from the channel 47 and thereby prevents the theft thereof.

Figure 6:
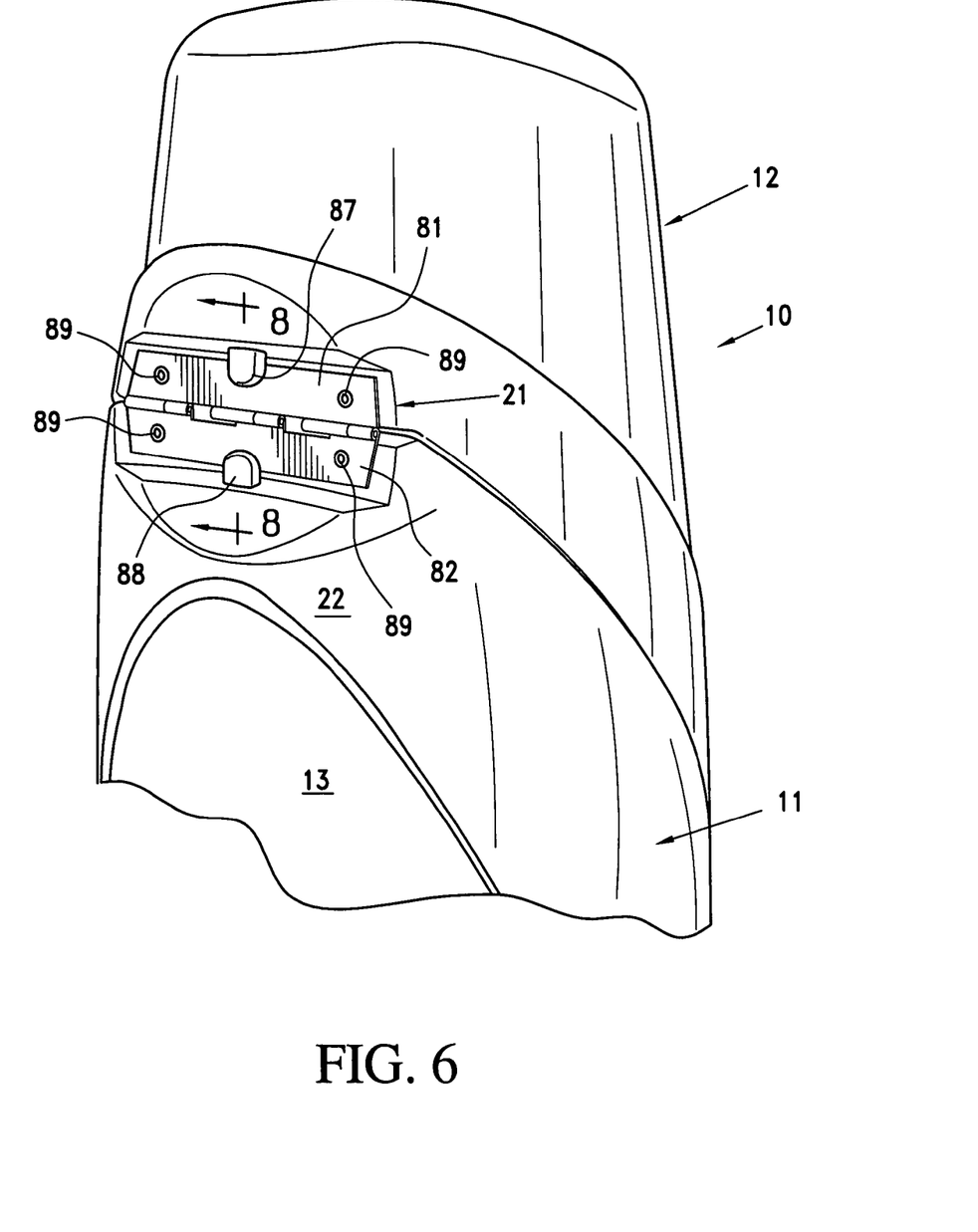
FIG. 6 is an enlarged fragmentary side perspective view of the cover closed relative to the tubular body of the carrier, and illustrates in detail a pivot or hinge for effecting lateral removal of the cover relative to the tubular body.
Figures 7, 8:
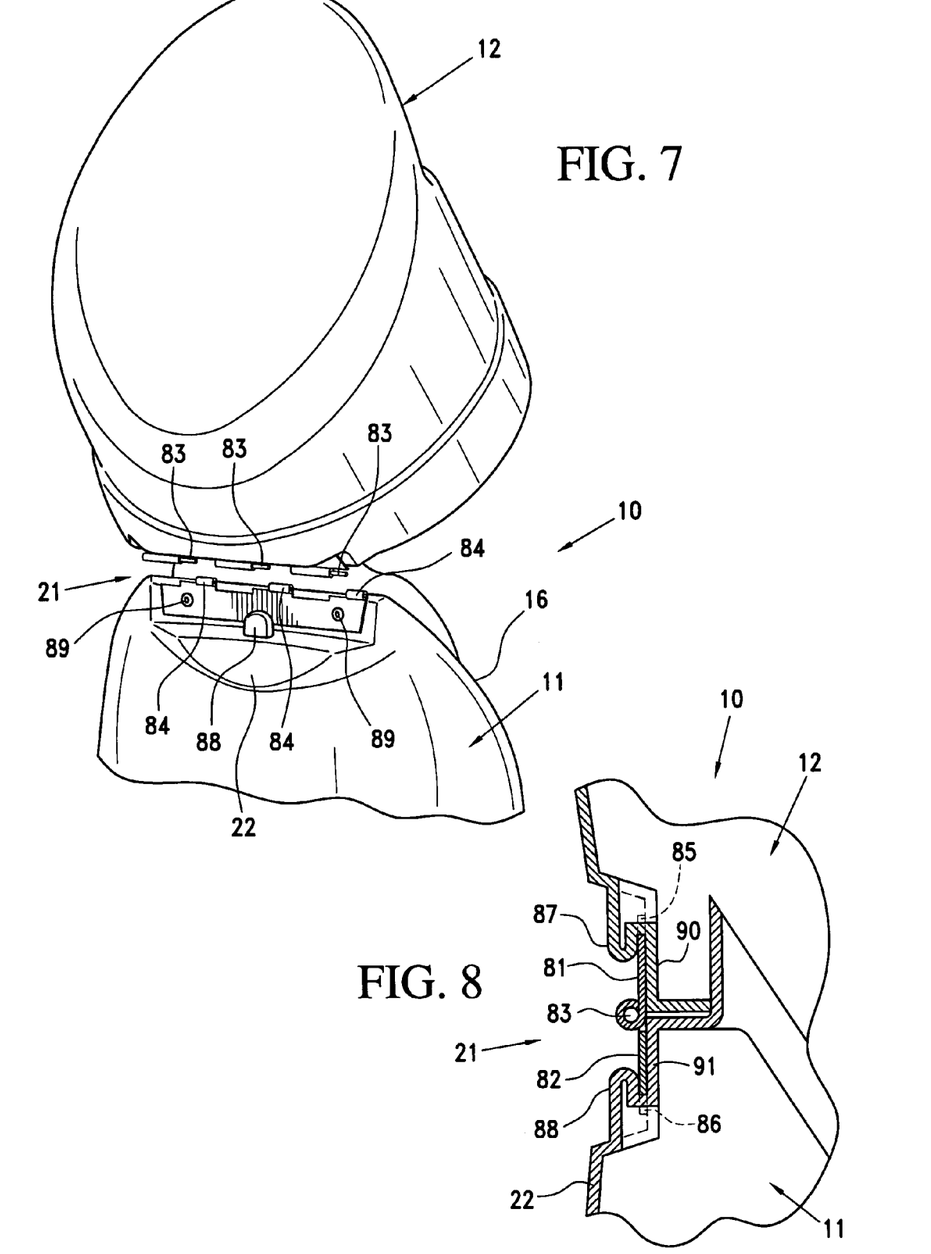
FIG. 7 is a fragmentary perspective view similar to FIG. 6, and illustrates the cover after having been removed from the tubular body by relative lateral motion therebetween substantially normal to a longitudinal axis of the tubular body.
FIG. 8 is an enlarged fragmentary cross-sectional view taken generally along line 8-8 of FIG. 6, and illustrates details of the hinge including a pin slidably received in a tubular sleeve or bearing and headed bosses of the cover and tubular body engaging relief areas or slots of hinge plates to effect reinforced connection thereof to the cover and tubular body.

Reference is specifically made to FIGS. 6 through 8 of the drawings which illustrate the pivot or hinge means 21 in detail and the manner in which the same effect lateral sliding connection/disconnection between the tubular body 11 and the cover 12.

The hinge means or pivot means 21 is defined by a first relatively flat metallic pivot member 81 and a second relatively flat metallic pivot member 82. The first pivot member 81 carries three pivot pins 83 (FIGS. 7 and 8) which project to the right, as viewed in FIG. 7. The second pivot member 82 carries three tubular bearings 84. The first and second pivot members 81, 82, respectively, include respective upwardly and downwardly directed relieved areas, notches or slots 85, 86, respectively (FIGS. 6 and 8), which slide beneath and are captively engaged by headed protrusions or bosses 87, 88, respectively, of the cover 12 and the tubular body 11. Rivets or similar fasteners 89 secure each of the pivot members 81, 82 to flatten wall portions 90, 91, respectively, of the cover 12 and tubular body 11.

As is readily apparent from FIG. 6, the cover 12 can be pivoted from its closed position by simply tilting the cover 12 rearwardly which will cause the same to pivot or hinge as the pivot pins 83 rotate in the tubular bearings 84. However, if the carrier 10 is carried by a vehicle having an upright or squared-off rear area, such as a SUV, the cover 12 might not pivot backwardly sufficiently to prevent access to the set of golf clubs within the tubular body 11. Under such conditions, the cover 12 need be but pivoted rearward a very slight amount to free the peripheral edges 16, 20 after which the cover 12 need but be slid laterally from the position shown in FIG. 6 parallel to the axis (unnumbered) of the pivot pins 83 until the latter are free of the tubular bearings 84. Thereafter, the cover can be lifted and removed from the tubular body 11 to gain access to the set of golf clubs therein.

The cover 12 is reattached or reassembled to the tubular body 11 by merely lowering the same from the position illustrated in FIG. 7 until the pivot pins 83 are aligned with the tubular bearings 64 after which the cover 17 is merely slid to the right until each pivot pin 83 is received in a tubular bearing 84. Thereafter, the cover 12 can be pivoted to a closed position.

In operation, assuming that a golf bag and a set of golf clubs are housed in the carrier 10 of FIG. 1, the vehicle V is driven to a golf destination and typically would stop at the "bag drop" of a golf club. The combination latch/locking mechanism 25 (FIG. 1) would then be unlocked and unlatched, the cover 12 pivoted to its open position (phantom outline in FIG. 1), and the golf club bag and its set of golf clubs removed therefrom. Thereafter, the cover 12 would be closed and re-latched/locked through the combination latch/locking mechanism 25 and the car V driven to an appropriate parking area. Obviously, the lock L (FIG. 4) prevents the carrier 10 from being stolen, except through destruction. After a round of golf, the golf club bag and set of golf clubs would be relocked in the carrier 10 while the golfer and perhaps his playing companions retire to the 19$^{th}$ hole. Locking the bag and golf clubs in the carrier 10 is far safer than leaving the same unattended in the environs of many golf courses. After returning home, the golfer need but remove the lock L (FIG. 4), lift the carrier upwardly to slidingly disconnect the rib 46 and the channel 47, and wheel the carrier 10 via the wheels 20, 20 while utilizing the handgrip portion 40 to a place of storage for subsequent use. The hitch assembly 48 can remain connected and locked to the hitch H of the vehicle V or can be removed thereof, as circumstances dictate.

It is to be particularly noted that the location of the handgrip portion 40 above the wheels 20, 20 is not only ergonomically sound relative to pushing and/or pulling the carrier 10, but by locating the handle 52 diametrically opposite to the handgrip portion 40, the carrier 10 can be ergonomically gripped with both hands for assembly and disassembly of the rib 46 relative to the channel 47. Therefore, the carrier 10 functions uniquely in all aspects of its intended functions in a relatively straightforward manner at a relatively nominal cost, while providing relatively maintenance-free long life.

Although a preferred embodiment of the invention has been specifically illustrated and described herein, it is to be understood that minor variations may be made in the apparatus without departing from the spirit and scope of the invention, as defined by the appended claims.

What is claimed is:

1. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said cover peripheral wall convergingly tapers away from said cover peripheral edge portion toward a converging terminal apex wall portion which defines a hand grip portion, and said terminal apex wall portion curves away from said vertical axis in the direction of a side of said tubular body at which are located said pivoting means and said connecting means.

2. The carrier as defined in claim 1 wherein said cover peripheral edge portion lies in a plane disposed in oblique relationship to said vertical axis in the cover first closed position thereby disposing an upper edge portion above a lower edge portion of said cover peripheral edge portion, and said cover upper edge portion is located at the same side of said tubular body as said pivoting means and said connecting means.

3. The carrier as defined in claim 1 wherein said removably connecting means includes first and second relatively vertically slidable connectors defined one by said tubular body and the other by a portion of a vehicle hitch, and said tubular body and vehicle hitch portion have cooperative aperture means adapted to receive a hasp of a lock to prevent unauthorized disconnecting of said removably connecting means.

4. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said removably connecting means includes first and second relatively vertically slidable connectors defined one by a portion of said tubular body and the other by a portion of a vehicle hitch, said tubular body and vehicle hitch portions have cooperative aperture means for receiving a hasp of a lock to prevent unauthorized disconnecting of said removably connecting means, one of said first and second relatively slidable connectors include one of a substantially vertically disposed rib and channel located adjacent said tubular body first end, and the other of said first and second relatively slidable connectors includes the other of said vertically disposed rib and channel of said vehicle hitch portion.

5. The carrier as defined in claim 4 wherein said pivoting means includes first and second pivot members respectively connected to said cover and said tubular body, and said first and second pivot members include means for slidingly assembling and disassembling said cover relative to said tubular body by relative movement therebetween along a path of travel substantially transverse to said tubular body substantially vertical axis.

6. The carrier as defined in claim 4 wherein said pivoting means includes first and second pivot members respectively connected to said cover and said tubular body, said first and second pivot members include means for slidingly assembling and disassembling said cover relative to said tubular body by relative movement therebetween along a path of travel substantially transverse to said tubular body substantially vertical axis, said tubular body opening includes diametrically opposite uppermost and lowermost ends, and said tubular body opening uppermost end is located contiguous said first and second pivot members.

7. The carrier as defined in claim 4 wherein said pivoting means includes first and second pivot members respectively connected to said cover and said tubular body, said first and second pivot members include means for slidingly assembling and disassembling said cover relative to said tubular body by relative movement therebetween along a path of travel substantially transverse to said tubular body substantially vertical axis, first interlocking means between said cover and said first pivot member for strengthening the connection therebetween, and second interlocking means between said cover and said second pivot member for strengthening the connection therebetween.

8. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said pivoting means includes first and second pivot members respectively connected to said cover and said tubular body, said first and second pivot members include means for slidingly assembling and disassembling said cover relative to said tubular body by relative movement therebetween along a path of travel substantially transverse to said tubular body substantially vertical axis, first interlocking means between said cover and said first pivot member for strengthening the connection therebetween, second interlocking means between said cover and said second pivot member for strengthening the connection therebetween, and said first and second interlocking means are each defined by a boss of one of said cover and tubular body received in a relief area of another of said cover and tubular body.

9. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said pivoting means includes first and second pivot members respectively connected to said cover and said tubular body, said first and second pivot members include means for slidingly assembling and disassembling said cover relative to said tubular body by relative movement therebetween along a path of travel substantially transverse to said tubular body substantially vertical axis, said first and second pivot members each include a substantially flat mounting plate portion, and said first and second slidingly assembling and disassembling means include at least one pivot pin and a bearing carried one by said first pivot member and the other by said second pivot member for effecting sliding assembly and disassembly thereof.

10. The carrier as defined in claim 4 wherein said connecting means includes a connecting portion of said tubular body vertically slidably connected to a connecting portion of a vehicle hitch bracket, and aperture means of each of said connecting portions being in registration for receiving a locking member to prevent disconnection of said connecting means.

11. The carrier as defined in claim 4 including a handgrip portion defined by said cover, wheels located adjacent said tubular body first end, and said handgrip portion and wheels are located at an opposite side of said carrier as said pivoting means and said connecting means.

12. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said connecting means includes one of a substantially vertically disposed rib and channel located adjacent said tubular body first end in vertically slidable relationship to each other, one of said rib and channel being carried by said tubular body first end, another of said rib and channel being carried by a vehicle hitch bracket, said cover peripheral wall convergingly tapers away from said cover peripheral edge portion toward a converging terminal apex wall portion which defines a hand grip portion, and said terminal apex wall portion curves away from said vertical axis in the direction of a side of said tubular body at which are located said pivoting means and said connecting means.

13. The carrier as defined in claim 12 wherein said cover peripheral edge portion lies in a plane disposed in oblique relationship to said vertical axis in the cover first closed position thereby disposing an upper edge portion above a lower edge portion of said cover peripheral edge portion, and said cover upper edge portion is located at the same side of said tubular body as said pivoting means and said connecting means.

14. The carrier as defined in claim 12 wherein said removably connecting means includes first and second relatively vertically slidable connectors defined one by said tubular body and the other by a portion of a vehicle hitch, and said tubular body and vehicle hitch portion have cooperative aperture means adapted to receive a hasp of a lock to prevent unauthorized disconnecting of said removably connecting means.

15. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second ooen position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said connecting means includes a connecting portion of said tubular body slidably connected to a connecting portion of a vehicle hitch bracket, aperture means of each of said connecting portions being in registration for receiving a locking member to prevent disconnection of said connecting means, said cover peripheral wall convergingly tapers away from said cover peripheral edge portion toward a converging terminal apex wall portion which defines a hand grip portion, and said terminal apex wall portion curves away from said vertical axis in the direction of a side of said tubular body at which are located said pivoting means and said connecting means.

16. The carrier as defined in claim 15 wherein said cover peripheral edge portion lies in a plane disposed in oblique relationship to said vertical axis in the cover first closed position thereby disposing an upper edge portion above a lower edge portion of said cover peripheral edge portion, and said cover upper edge portion is located at the same side of said tubular body as said pivoting means and said connecting means.

17. The carrier as defined in claim 3 including a handgrip portion defined by said cover, and wheels located adjacent said tubular body first end.

18. The carrier as defined in claim 3 including a handgrip portion defined by said cover, wheels located adjacent said tubular body first end, and said handgrip portion and wheels are located at an opposite side of said carrier as said pivoting means and said connecting means.

19. A carrier comprising a substantially tubular body and a cover each made of synthetic polymeric/copolymeric plastic material; said tubular body being defined by a peripheral wall closed at a first end byb a bottom wall and having an upper peripheral edge portion at a second end ooposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said removably connecting means includes first and second relatively slidable connectors defined one by said tubular body and the other by a portion of a vehicle hitch oprtion, said tubular body and vehicle hitch portion have cooperative aqerture means adapted to receive a hasp of a lock to prevent unauthorized disconnecting of said removably connecting means, said cover peripheral wall convergingly tapers away from said cover peripheral edge portion toward a converging terminal apex wall portion which defines a hand grip portion, and said terminal apex wall portion curves away from said vertical axis in the direction of a side of said tubular body at which are located said pivoting means and said connecting means.

20. The carrier as defined in claim 19 wherein said cover peripheral edge portion lies in a plane disposed in oblique relationship to said vertical axis in the cover first closed position thereby disposing an upper edge portion above a lower edge portion of said cover peripheral edge portion, and said cover upper edge portion is located at the same side of said tubular body as said pivoting means and said connecting means.

21. A carrier comorising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said removably connecting means includes first and second relatively vertically slidable connectors defined one by said tubular body and the other by a portion of a vehicle hitch, said tubular body and vehicle hitch portion have cooperative aperture means adapted to receive a hasp of a lock to prevent unauthorized disconnecting of said removably connecting means, a handgrip portion defined by said cover, wheels located adjacent said tubular body first end, and said handgrip portion and wheels are located at an opposite side of said carrier as said pivoting means and said connecting means, said cover peripheral wall convergingly tapers away from said cover peripheral edge portion toward a converging terminal apex wall portion which defines a hand grip portion, and said terminal apex wall portion curves away from said vertical axis in the direction of a side of said tubular body at which are located said pivoting means and said connecting means.

22. The carrier as defined in claim 21 wherein said cover peripheral edge portion lies in a plane disposed in oblique relationship to said vertical axis in the cover first closed position thereby disposing an upper edge portion above a lower edge portion of said cover peripheral edge portion, and said cover upper edge portion is located at the same side of said tubular body as said pivoting means and said connecting means.

23. A carrier comprising a substantially tubular body and a cover each made of synthetic polymeric/copolymeric plastic material; said tubular body being defined by a peripheral wall closed at a first end by a bottom wall and having a peripheral edge portion at a second end opposite said first end which defines an opening of said tubular body; said cover including a peripheral wall having a peripheral edge portion substantially matching said tubular body peripheral edge portion to close said opening in a first closed position of said cover relative to said tubular body, means for pivoting said cover relative to said tubular body between said first closed position and a second open position, means for removably connecting said tubular body to a vehicle, said connecting means includes a connecting portion of said tubular body in vertical downward sliding connecting relationship to a connecting portion of a vehicle hitch bracket, cooperative abutment means of said connecting portions aligned for vertical sliding abutment to delimit downward relative sliding movement of said connection portions, and aperture means of each of said connecting portions being brought into registration by said cooperative abutment means for receiving a locking member to prevent disconnection of said connecting means to thereby prevent removal of said tubular body from said vehicle hitch bracket, said connecting portions being defined bya rib in sliding relationship to a channel, and cooperative abutment means of said rib and channel being aligned for relative vertical sliding abutment to delimit the relative vertical downward sliding movement of said rib and channel.

24. The carrier as defined in claim 23 wherein said connecting means include a rib in sliding relationship to a channel, and said cooperative abutment means include at least one flange of said channel abutting an opposite abutting surface of said tubular body.

25. The carrier as defined in claim 23 wherein said connecting means include a rib in sliding relationship to a channel, and said cooperative abutment means include a pair of flanges of said channel abutting an opposite an opposing pair of abutting surfaces of said tubular body.

26. The carrier as defined in claim 23 wherein said connecting means include a rib in sliding relationship to a channel, and said cooperative abutment means include a pair of angled flanges of said channel abutting an opposite an opposing pair of angled abutting surfaces of said tubular body.

27. The carrier as defined in claim 23 including aperture means of each of said connecting portions in registration for receiving a locking member to prevent disconnection of said connecting means.

28. The carrier as defined in claim 27 wherein said aperture means are located in side-by-side walls of said connection portions.

29. The carrier as defined in claim 28 wherein said connecting portions are defined by a rib in sliding relationship to a channel, said channel includes an upwardly opening slot, and the side-by-side wall of the rib is received in said slot.

30. The carrier as defined in claim 27 wherein said connecting means include a rib in sliding relationship to a channel, and said cooperative abutment means include at least one flange of said channel abutting an opposite abutting surface of said tubular body.

31. The carrier as defined in claim 27 wherein said connecting means include a rib in sliding relationship to a channel, and said cooperative abutment means include a pair of flanges of said channel abutting an opposite an opposing pair of abutting surfaces of said tubular body.

32. The carrier as defined in claim 27 wherein said connecting means include a rib in sliding relationship to a channel, and said cooperative abutment means include a pair of angled flanges of said channel abutting an opposite an opposing pair of angled abutting surfaces of said tubular body.

33. A carrier comprising a substantially tubular body and a cover each made of synthetic polymeric/copolymeric plastic material; said tubular body being defined by a peripheral wall closed at a first end by a bottom wall and having a peripheral edge portion at a second end opposite said first end which defines an ooening of said tubular body; said cover including a peripheral wall having a peripheral edge portion substantially matching said tubular body peripheral edge portion to close said opening in a first closed position of said cover relative to said tubular body. means for pivoting said cover relative to said tubular body between said first closed position and a second open position, means for removably connecting said tubular body to a vehicle, said connecting means includes a connecting portion of said tubular body vertically slidably connected to a connecting portion of a vehicle hitch bracket, aoerture means of each of said connecting portions being in registration for receiving a locking member to prevent disconnection of said connecting means to thereby prevent removal of said tubular body from said vehicle hitch bracket, said connecting portions beina defined by a rib in sliding relationship to a channel, cooperative abutment means of said rib and channel being aligned for relative vertical sliding abutment to delimit the relative vertical downward sliding movement of said rib and channel, and said abutment means are abutment surfaces of said rib and channel disposed in converging relationship.

34. The carrier as defined in claim 33 wherein said abutment means are abutment surfaces of said rib and channel disposed in downwardly converging relationship.

35. The carrier as defined in claim 33 wherein said aperture means are located substantially at the convergence of said converging surfaces.

36. The carrier as defined in claim 34 wherein said aperture means are located substantially at the convergence of said converging surfaces.

37. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said connecting means includes one of a substantially vertically disposed rib and channel located adjacent said tubular body first end in vertically slidable relationship to each other, one of said rib and channel being carried by said tubular body first end, another of said rib and channel being carried by a vehicle hitch bracket, a handgrip portion defined by said cover, wheels located adjacent said tubular body first end, said hand grip portion being located substantially diametrically opposite said cover pivoting means, said cover peripheral edge portion lying in a plane disposed oblique relationship to said vertical axis in the cover first closed portion thereby disposing an upper edge portion above a lower edge portion of said cover peripheral edge portion, said cover upper edge portion being located on the same side of said tubular body as said pivoting means and said connecting means, aperture means of each of said connecting portions being in registration for receiving a locking member to prevent disconnection of said connecting means to thereby prevent removal of said tubular body from said vehicle hitch bracket, cooperative abutment means of said rib and channel being aligned for relative vertical sliding abutment to delimit the relative vertical downward sliding movement of said rib and channel, and said aperture means of each of said connecting portions being brought into registration by said cooperative abutment means for receiving a locking member to prevent disconnection of said connecting means.

38. A carrier comprising a substantially tubular body and a cover each made of synthetic polymeric/copolymeric plastic material; said tubular body being defined by a peripheral wall closed at a first end by a bottom wall and having an upper peripheral edge portion at a second end opposite said first end which defines an opening of said tubular body; said cover including a peripheral wall having a peripheral edge portion substantially matching said tubular body upper peripheral edge portion to close said opening in a first closed position of said cover relative to said tubular body, means for pivoting said cover relative to said tubular body between said first closed position and a second open position, means for removably connecting said tubular body to a vehicle, said pivoting means and said connecting means are located in substantially vertically spaced and substantially vertically aligned relationship along a substantially vertical plane through a substantially vertical axis of said tubular body whereby pivotal opening motion of said cover is in an upward direction toward a vehicle to which said carrier is adapted to be connected by said connecting means thereby facilitating access to an interior of said tubular body, said connecting means includes one of a substantially vertically disposed rib and channel located adjacent said tubular body first end in vertically slidable relationship to each other, one of said rib and channel being carried by said tubular body first end, another of said rib and channel being carried by a vehicle hitch bracket, a handgrip portion defined by said cover, wheels located adjacent said tubular body first end substantially diametrically opposite to one of said one and another rib and channel, and said hand grip portion being located substantially diametrically opposite said cover pivoting means and above said wheels.

* * * * *

UNITED STATES PATENT AND TRADEMARK OFFICE
CERTIFICATE OF CORRECTION

PATENT NO. : 7,487,895 B2  
APPLICATION NO. : 10/852219  
DATED : February 10, 2009  
INVENTOR(S) : Ronald G. Hesmer Page 1 of 1

It is certified that error appears in the above-identified patent and that said Letters Patent is hereby corrected as shown below:

Column 10 – Line 3, claim 15 replace "ooen" with --open--.

Column 10 – Line 43, claim 19 replace "byb" with --by--.

Column 10 – Line 44, claim 19 replace "ooposite" with --opposite--.

Column 10 – Line 63, claim 19 replace "oprtion" with --portion--.

Column 10 – Line 64, claim 19 replace "aqeture" with --aperture--.

Column 12 – Line 15, claim 23 replace "bya" with --by a--.

Column 12 – Line 66, claim 33 replace "ooening" with --opening--.

Column 13 – Line 3, claim 33 replace "." after body with --,--.

Column 13 – Line 9, claim 33 replace "aoerture" with --aperture--.

Column 13 – Line 43, claim 37 replace "beina" with --being--.

Signed and Sealed this

Seventh Day of July, 2009

JOHN DOLL  
*Acting Director of the United States Patent and Trademark Office*